United States Patent

Wang et al.

[11] Patent Number: 6,030,699
[45] Date of Patent: Feb. 29, 2000

[54] UV ABSORBING POLYMER PARTICLE FOR USE IN IMAGING ELEMENTS

[75] Inventors: Yongcai Wang, Penfield; Dennis E. Smith; Kurt M. Schroeder, both of Rochester, all of N.Y.

[73] Assignee: Eastman Kodak Company, Rochester, N.Y.

[21] Appl. No.: 09/255,166

[22] Filed: Feb. 22, 1999

Related U.S. Application Data

[62] Division of application No. 08/815,525, Mar. 12, 1997, Pat. No. 5,919,850.

[51] Int. Cl.[7] .............................. B23B 5/16; G03C 1/815
[52] U.S. Cl. ........................................... 428/327; 430/512
[58] Field of Search ............................. 428/327; 430/512

[56] References Cited

U.S. PATENT DOCUMENTS

| | | | |
|---|---|---|---|
| 2,739,888 | 3/1956 | Sawdey | 95/2 |
| 3,215,530 | 11/1965 | Riebel et al. | 96/48 |
| 3,352,681 | 11/1967 | Ohi et al. | 96/84 |
| 3,707,375 | 12/1972 | Ohi et al. | 430/517 |
| 4,199,363 | 4/1980 | Chen | 430/512 |
| 4,247,627 | 1/1981 | Chen | 430/512 |
| 4,304,769 | 12/1981 | Chen | 430/218 |
| 4,368,258 | 1/1983 | Fujiwhara et al. | 430/498 |
| 5,110,717 | 5/1992 | Czekai et al. | 96/84 |
| 5,536,628 | 7/1996 | Wang et al. | 430/531 |

*Primary Examiner*—Kriellion Sanders
*Attorney, Agent, or Firm*—Carl F. Ruoff; Doreen M. Wells

[57] ABSTRACT

This invention provides an ultraviolet ray absorbing polymer particle which includes a first ultraviolet ray absorber represented by formula I as further defined in claim 1:

(I)

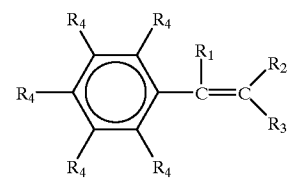

and a second ray absorber represented by formula II as further defined in claim 1:

(II)

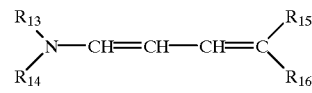

7 Claims, No Drawings

UV ABSORBING POLYMER PARTICLE FOR USE IN IMAGING ELEMENTS

CROSS REFERENCE TO RELATED APPLICATIONS

This is a Division of U.S. Ser. No. 08/815,525, filed Mar. 12, 1997, now U.S. Pat. No. 5,919,850.

FIELD OF THE INVENTION

This invention relates to imaging elements and particularly photographic elements comprising a support having at least one coated layer containing a binder and an ultraviolet ray absorbing polymer particle. This invention provides novel ultraviolet ray absorbing polymer particles that have excellent stability against crystallization and leaching out of ultraviolet ray absorbers into water phase with respect to the storage and use of such particles and to the manufacturing process of an image element.

BACKGROUND OF THE INVENTION

It is conventional to incorporate an absorbing compound or absorber, in particular, an ultraviolet ray absorber, in an image element to absorb light in a specific wavelength region. The ultraviolet ray absorbing light-insensitive layer is used, for example, in silver halide photographic elements, to control the spectral composition of light incident upon a photographic emulsion layer, and to absorb or to remove ultraviolet light produced by static discharge, which occurs when the surfaces of the photographic element come into contact during production or treatment processes. Electric charges are generated by friction of separation. When accumulation of static electricity by charging reaches a certain limiting value, atmospheric discharge occurs at a particular moment and a discharge spark fires at the same time. When the photographic element is exposed to light by discharging, static marks appear after development.

Different methods for incorporating an ultraviolet ray absorber into a photographic element have been described in, for example, U.S. Pat. Nos. 2,739,888, 3,215,530, 3,352,681, and 3,707,375, where an oil soluble absorber is dissolved in a high boiling organic solvent, and mixed under high shear or turbulence together with an aqueous medium, which may also contain a surfactant, in order to break the organic phase into submicron particles dispersed in the continuous aqueous phase. However, when such dispersions are used in a light-insensitive layer, the layer becomes soft and the mechanical properties of the layer is lowered. Furthermore, even if no high boiling solvent is used, many absorbers themselves are liquid, and they therefore can have a detrimental effect on the mechanical properties of the layer and adhesion with the adjacent layer. In order to prevent these problems, a large amount of gelatin has been used in the layer containing ultraviolet ray absorbers.

When the above dispersions containing the ultraviolet ray absorbers are incorporated in the outermost protective layer of a photographic element, both the organic solvent and ultraviolet ray absorber often migrate to the surface of the layer. These leached out oily materials not only degrade the physical properties of photographic elements, but also can easily be transferred to manufacturing and processing equipment, causing transportation difficulties. Furthermore, the outermost protective layer often comprises a polymeric matting agent such as poly(methyl methacrylate) or polystyrene. The coupler solvents used for dissolving ultraviolet ray absorbers are good solvents for these polymers. When a polymeric matting agent and coupler solvents are contained in the same solution, coupler solvents partition into, swell, and deform the polymeric matte particles. This greatly diminishes surface matting effect, causing unexpected manufacturing difficulties. Therefore, an additional overcoat layer has to be used to minimize the undesirable blooming phenomenon and the interactions between coupler solvents and polymeric matting agents, which often requires an additional coating station, thereby increasing manufacturing cost.

U.S. Pat. No. 5,110,717 describes a method of incorporating an ultraviolet ray absorber or coupler by mechanically grinding a crystalline material to a desired particle size in a liquid that is not a solvent for the material, heating the crystalline particles to above their melting point, and cooling the melted particles to form amorphous particles.

Ultraviolet ray absorbing polymer particles obtained by polymerization of ultraviolet ray absorbing monomers are also known in the art. Different methods can be used to prepare such particles, for example, by emulsion polymerization, or by microemulsion polymerization, or by dispersion of preformed ultraviolet ray absorbing polymers. Disadvantages of using such polymer particles are their high cost and poor light stability.

Another method of incorporating an ultraviolet ray absorber into a photographic element is by loading such an absorber into pre-formed latex particles as described in U.S. Pat. Nos. 4,199,363, 4,304,769, 4,247,627, and 4,368,258. In this process, a hydrophobe is first dissolved in a water miscible organic solvent and then blended with an aqueous latex. Removing the water miscible solvent subsequent to loading requires large scale processing equipment and lengthy processing times, which increases the expenses of the incorporation procedure and cost of the resulting products.

U.S. Pat. No. 5,536,628 describes a process for incorporating absorbing compounds into a pre-formed latex polymer particle. In the process a polymer latex of known solids is heated with stirring to 70 to 80° C. The absorber is heated until it reaches its liquid state and is mixed with the polymer latex at high shear to generate an emulsion. The emulsion is then passed through a high energy homogenizer at least once to form an absorbing compound impregnated latex polymer dispersion.

Processes described in U.S. Pat. Nos. 5,536,628, 4,199,363, 4,304,769, 4,247,627, and 4,368,258 can still result in residual ultraviolet ray absorbers in the aqueous phase, which can then crystallize or form large oil droplets during storage and use. The ultraviolet ray absorbers can also diffuse out of the polymer particles to aggravate crystallization and oil droplet formation further shortening the shelf life of ultraviolet ray absorbing polymer particles. In addition, even small amounts of oil droplets or crystals can significantly degrade the physical and photographic properties of a photographic element by generating spot defects in the final coated layers.

PROBLEM TO BE SOLVED BY INVENTION

Therefore, an objective of the present invention is to provide an improved ultraviolet ray absorbing polymer particle having excellent stability against crystallization and leaching out of ultraviolet ray absorbers into water phase with respect to the storage and use of such particles and to the manufacturing process of an image element.

SUMMARY OF THE INVENTION

This invention provides an ultraviolet ray absorbing polymer particle comprising:

a first ultraviolet ray absorber represented by formula I:

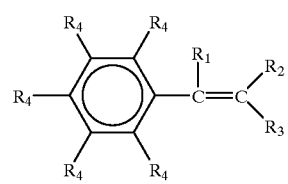

(I)

wherein $R_4$, may be the same or different, and each represents a hydrogen atom, or a halogen atom, an alkyl, an aryl group having from 6 to 20 carbon atoms, an alkoxy group, an aryloxy, an alkylthio group, an arylthio group, an amine group, an alkylamino group, an arylamino group, an hydroxyl group, a cyano group, a nitro group, an acylamino group, a sulfonyl group, a sulfoamido group, an acyloxy group, or an oxycarbonyl group, or two neighboring R groups may form a 5- or 6-member ring by ring closure. $R_1$ represents a hydrogen atom, or an alkyl group. $R_2$ or $R_3$ each represents a cyano group, —$COOR_9$, —CO—$NHR_9$, —$SO_2R_9$, CO—$R_9$, where $R_9$ represents an alkyl group, and an aryl group;

a second ultraviolet ray absorber represented by formula II:

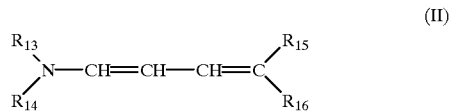

(II)

where $R_{13}$, and $R_{14}$, which may be the same or different, each represents a hydrogen atom, an alkyl group, an aryl group, $R_{15}$ and $R_{16}$ each represents a cyano group, —$COOR_{17}$, $COR_{17}$, or $SO_2R_{17}$, where $R_{17}$ represents an alkyl group, or an aryl group; and a polymer comprising units derived from a first monomer A and less than 20 weight percent of a second monomer B, where the first monomer A represents ethylenically unsaturated monomers comprising greater than 20 weight percent of an acrylic monomer selected from acrylic acid and methacrylic acid esters where the ester group contains at least 2 carbon atoms, and the second monmer B represents ethylenically unsaturated monomers capable of forming water soluble polymers.

In a particular embodiment, the invention is directed to an imaging element comprising a support, and an auxiliary layer and is characterized in the auxiliary layer comprising a binder and an aforesaid ultraviolet ray absorbing polymer particle.

DETAILED DESCRIPTION OF THE INVENTION

In accordance with the present invention, the polymer contained in the ultraviolet ray absorbing particle of the invention comprises units derived from monomer A and less than 20 weight % of monomer B, where A represents ethylenically unsaturated monomers comprising greater than 20 weight percent of an acrylic monomer selected from acrylic acid and methacrylic acid esters where the ester group contains at least 2 carbon atoms, and B represents ethylenically unsaturated monomers capable of forming water soluble polymers.

Suitable acrylic acid and methacrylic acid esters where the ester group contains at least 2 carbon atoms or more and which can be used to form component A of the present invention may include, for example, ethyl methacrylate, n-butyl methacrylate, isobutyl methacrylate, t-butyl methacrylate, isopropyl methacrylate, amyl methacrylate, hexyl methacrylate, cyclohexyl methacrylate, chloroethyl methacrylate, ethyl acrylate, n-butyl acrylate, t-butyl acrylate, isopropyl acrylate, amyl acrylate, cyclohexyl acrylate, hexyl acrylate, n-octyl acrylate, lauryl methacrylate, 2-ethylhexyl methacrylate, nonyl acrylate, benzyl methacrylate, and the like. Other ethylenically unsaturated monomers which can used together with the acrylic acid and methacrylic acid esters to form component A of the present invention may include, for example, methyl methacrylate, methyl acrylate, acrylonitrile, methacrylonitrile, butyl acrylamide, vinyl acetate, vinyl propionate, vinylidene chloride, vinyl chloride, styrene, t-butyl styrene, ethyl vinyl benzene, vinyl toluene, dialkyl maleates, dialkyl itaconates and dialkyl malonates. Crosslinking and grafting monomers which may be used together with the foregoing monomers to crosslink the ultraviolet ray absorbing polymer particles are polyfunctional with respect to the polymerization reaction, and may include, for example, esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctuional aromatic compounds such as divinyl benzene.

Suitable ethylenically unsaturated nonionic hydrophilic monomers which can be used as component B of the present invention may include, for example, (meth)acrylamides such as acrylamide, methacrylamde, N,N-dimethyl acrylamide, N-methylol acrylamide, and isopropyl acrylamide. Additional suitable hydrophilic monomers include poly(ethylene glycol)(meth)acrylates, N-vinyl-2-pyrrolidone, vinylimidazole, and the like.

Suitable ethylenically unsaturated ionic monomers which can be used as component B of the present invention include, for example, monomers containing carboxylic acid, sulfo, or oxysulfo pendent groups, or salts of such groups. Representative monomers include acrylic acid, methacrylic acid, sodium acrylamido-2-methylpropane sulfonate, and sodium styrene sulfonate.

In general, the amount of ultraviolet absorbers impregnated into the polymer particles can be anywhere within the range of 1:40 to 3:1 in terms of a weight ratio of ultraviolet ray absorber to polymer. It is preferred that the weight ratio is in the range of from about 1:10 to 2:1, and most preferably from about 1:5 to 1:1. The size of the ultraviolet ray absorbing polymer particles can be anywhere from about 0.01 µm to 50 µm, preferably from 0.02 µm to 10 µm, and most preferably from 0.02 µm to 1 µm.

The ultraviolet ray absorber represented by formula I in general has the following structure:

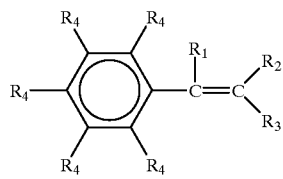

(I)

wherein $R_4$, may the same or different, and each represents a hydrogen atom, or a halogen atom, an alkyl, an aryl group having from 6 to 20 carbon atoms, an alkoxy group, an aryloxy, an alkylthio group, an arylthio group, an amine group, an alkylamino group, an arylamino group, an hydroxyl group, a cyano group, a nitro group, an acylamino group, a sulfonyl group, a sulfoamido group, an acyloxy group, or an oxycarbonyl group, or two neighboring R groups may form a 5- or 6-member ring by ring closure. $R_1$ represents a hydrogen atom, or an alkyl group. $R_2$ or $R_3$ each represents a cyano group, —$COOR_9$, —CO—$NHR_9$, —$SO_2R_9$, CO—G, where $R_9$ represents an alkyl group, and an aryl group.

Most preferred ultraviolet ray absorbers represented by formula I are given by formula III.

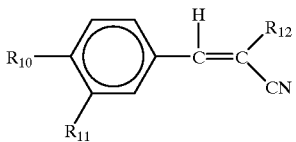

(III)

The following represents limited examples of compounds given by formula III.

| Compound No. | $R_{10}$ | $R_{11}$ | $R_{12}$ |
|---|---|---|---|
| UV-1 | H | H | $CO_2C_{16}H_{33}$ |
| UV-2 | $CH_3$ | H | $CO_2C_{16}H_{33}$ |
| UV-3 | $CH_3$ | H | $CO_2C_3H_7$ |
| UV-4 | $CH_3$ | H | $CO_2C_{12}H_{25}$ |
| UV-5 | $CH_3$ | H | $SO_2C_{12}H_{25}$ |
| UV-6 | $OCH_3$ | H | $CO_2C_3H_7$ |
| UV-7 | $OCH_3$ | H | $CO_2C_5H_{11}$ |
| UV-8 | $OCH_3$ | H | 2-ethylhexyl |
| UV-9 | $OCH_3$ | H | $CO_2C_8H_{17}$ |
| UV-10 | $OCH_3$ | H | $CO_2C_9H_{19}$ |
| UV-11 | $OCH_3$ | H | $CO_2C_{10}H_{21}$ |
| UV-12 | $OCH_3$ | H | $CO_2C_{12}H_{25}$ |
| UV-13 | $OCH_3$ | H | $CO_2C_{16}H_{33}$ |
| UV-14 | $OCH_3$ | H | $CO_2C_{18}H_{37}$ |
| UV-15 | $OCH_3$ | H | $SO_2C_{12}H_{25}$ |
| UV-16 | $OCH_3$ | H | $SO_2C_{10}H_{21}$ |
| UV-17 | $OCH_3$ | H | $SO_2C_8H_{17}$ |
| UV-18 | $OCH_3$ | H | $SO_2C_6H_{13}$ |
| UV-19 | $OCH_3$ | H | $SO_2C_4H_9$ |
| UV-20 | $OCH_3$ | H | $SO_2C_3H_7$ |
| UV-21 | $OCH_3$ | H | $SO_2CH_3$ |
| UV-22 | $OC_3H_7$ | H | $CO_2C_3H_7$ |
| UV-22 | $OC_3H_7$ | H | $CO_2C_5H_{11}$ |
| UV-23 | $OC_3H_7$ | H | 2-ethylhexyl |
| UV-24 | $OC_3H_7$ | H | $CO_2C_8H_{17}$ |
| UV-25 | $OC_3H_7$ | H | $CO_2C_9H_{19}$ |
| UV-26 | $OC_3H_7$ | H | $CO_2C_{10}H_{21}$ |
| UV-27 | $OC_3H_7$ | H | $CO_2C_{12}H_{25}$ |
| UV-28 | $OC_3H_7$ | H | $CO_2C_{16}H_{33}$ |
| UV-29 | $OC_3H_7$ | H | $CO_2C_{18}H_{37}$ |
| UV-30 | $OC_3H_7$ | H | $SO_2C_{12}H_{25}$ |
| UV-31 | $OC_3H_7$ | H | $SO_2C_{10}H_{21}$ |
| UV-32 | $OC_3H_7$ | H | $SO_2C_8H_{17}$ |
| UV-33 | $OC_3H_7$ | H | $SO_2C_6H_{13}$ |
| UV-34 | $OC_3H_7$ | H | $SO_2C_4H_9$ |
| UV-35 | $OC_3H_7$ | H | $SO_2C_3H_7$ |
| UV-36 | $OC_3H_7$ | H | $SO_2CH_3$ |
| UV-37 | $CO_2H_5$ | $OCH_3$ | $CO_2C_2H_5$ |
| UV-38 | $OC_4H_9$ | $OCH_3$ | $CO_2C_2H_5$ |
| UV-39 | $OC_6H_5$ | $OCH_3$ | $CO_2C_2H_{52}CH$ |
| UV-40 | $OCH_2C_6H_5$ | OH | $CO_2C_2H_5$ |
| UV-41 | $OC_4H_9$ | $OCH_3$ | $CO_2C_2H_5$ |
| UV-42 | $OCH_2OCO_2C_2H_5$ | $OCH_3$ | $CONHC_6H_5$ |
| UV-43 | $CO_2H_4OCOCH_3$ | $OCH_3$ | $OCNHCH_2C_6H_5$ |

The ultraviolet ray absorber represented by Formula II has the following structure:

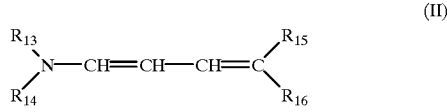

(II)

where $R_{13}$, and $R_{14}$, which may be the same or different, each represents a hydrogen atom, an alkyl group, an aryl group, $R_{15}$ and $R_{16}$ each represents a cyano group, $COOR_{17}$, $COR_{17}$, $SO_2R_{17}$, where $R_{17}$ represents an alkyl group, or an aryl group.

The ultraviolet ray absorbing polymer particles of this invention can be made by various well-known techniques in the art, such as, for example, emulsion polymerization, dispersion polymerization, suspension polymerization, and the like (see, for example, Padget, J. C. in *Journal of Coating Technology*, Vol 66, No. 839, pages 89–105, 1994;El-Aasser, M. S. and Fitch, R. M. Ed. *Future Directions in Polymer Colloids*, NATO ASI Series, No 138, Martinus Nijhoff Publishers, 1987; Arshady, R. *Colloid & Polymer Science*, 1992, No 270, pages 717–732; Odian, G. *Principles of Polymerization*, 2nd Ed. Wiley(1981); and Sorenson, W. P. and Campbell, T. W. *Preparation Method of Polymer Chemistry*, 2nd Ed, Wiley (1968)).

A preferred method of preparing ultraviolet ray absorbing polymer particles in accordance with this invention is by a limited coalescence technique where a mixture of polymerizable monomers and ultraviolet ray absorbers is added to an aqueous medium containing a particulate suspending agent to form a discontinuous (oil droplet) phase in continuous (water) phase. The mixture is subjected to shearing forces, by agitation, homogenization and the like to reduce the size of the droplets. After shearing is stopped an equilibrium is reached with respect to the size of the droplets as a result of the stabilizing action of the particulate suspending agent in coating the surface of the droplets and then polymerization is completed to form an aqueous suspension of polymer particles. This process is described in U.S. Pat. Nos. 2,932, 629; 5,279,934; and 5,378,577 incorporated herein by reference.

The second preferred method of preparing ultraviolet ray absorbing polymer particles in accordance with this invention is by an emulsion polymerization process where an ultraviolet ray absorber is mixed with an ethylenically unsaturated monomer or its mixture together with a water soluble initiator and a surfactant. The polymerization process is initiated in general with free radical initiators. Free radicals of any sort may be used. Preferred initiators include persulfates (such as ammonium persulfate, potassium persulfate, etc.), peroxides (such as hydrogen), azo compounds (such azobiscyanovaleric acid), and redox initiators (such as hydrogen peroxide-iron(II) salt, potassium persulfate-sodium hydrogen sulfate, etc.). Surfactants which can be used include, for example, a sulfate, a sulfonate, a cationic compound, an amphoteric compound, and a polymeric protective colloid. Specific examples are described in "McCUTCHEON'S Volume 1: Emulsifiers & Detergents, 1995, North American Edition". Chain transfer agents may also be used to control the properties of the polymer particles formed.

The third preferred method of preparing ultraviolet ray absorbing polymer particle of the invention is by loading an ultraviolet ray absorber into a pre-formed latex particle as described in, for example, U.S. Pat. Nos. 4,199,363, 4,304,769, 4,247,627, 4,368,258, and 5,536,628. The loading process described in U.S. Pat. No. 5,536,628 does not use organic solvents, therefore is particularly preferred. A polymer latex of known solids is heated with stirring to 70 to 80° C. An ultraviolet ray absorber is heated until it reaches its liquid state and is mixed with the preheated polymer latex at high shear to generate an emulsion. The emulsion is then passed through a high energy homogenizer at least once to form an ultraviolet ray absorber impregnated latex polymer dispersion. In the process, a water soluble polymeric steric stabilizer can be used to assist the loading and the stability of resultant dispersion. Such water soluble polymeric compounds include gelatin, poly(vinyl alcohol), poly(vinyl pyrrolidone), and the like.

The imaging elements to which this invention relates can be any of many different types depending on the particular use for which they are intended. Such elements include, for example, photographic, electrostatographic, photothermographic, migration, electrothermographic, dielectric recording, and thermal dye transfer imaging elements. The imaging elements in accordance with this invention can comprise various polymeric films, papers, glass, and the like, but both acetate and polyester supports well known in the art are preferred. The thickness of the support is not critical. Support thickness of 2 to 10 mil (0.002 to 0.010 inches) can be used. The supports typically employ an undercoat or subbing layer well known in the art that comprises, for example, for polyester support a vinylidene chloride/methyl acrylate/itaconic acid terpolymer or vinylidene chloride/acrylonitrile/acrylic acid terpolymer.

Any suitable binders can be used in practice of the present invention. They include hydrophilic colloids such as gelatin as well as hydrophobic polymer resin binders. The actual amount of binder and ultraviolet ray absorbing particle will vary depending on the types of applications. It is preferred that the binder is coated at a weight ratio to the ultraviolet ray absorbing particle from about 1:100 to 100:1, and more preferably from 20:80 to 95:5.

Useful resin binders include polyurethanes (e.g. Neorez R960 sold by ICI), cellulose acetates (e.g. cellulose diacetate, cellulose acetate butyrate, cellulose acetate propionate), poly(methyl methacrylate), polyesters (e.g. Vitel R sold by Goodyear Tire & Rubber Co.), polyamides (e.g. Unirez sold by Union Camp, Vesamide sold by General Electric Co.), polycarbonates (e.g. Makrolon sold by Mobay Chemical Co., Lexan sold by General Electric Co.), polyvinyl acetate, and the like.

Any suitable hydrophilic binder can be used in practice of this invention, such as naturally occurring substances such as proteins, protein derivatives, cellulose derivatives (e.g. cellulose esters), polysaccharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl sulfonic acid copolymers, vinyl imidazole copolymers, vinyl sulfide copolymers, homopolymer or copolymers containing styrene sulfonic acid, and the like. Gelatin is the most preferred hydrophilic binder.

The image element of the present invention can contain at least one electrically conductive layer, which can be either surface protective layer or a sub layer. The surface resistivity of at least one side of the support is preferably less than $1 \times 10^{12}$ Ω/square, more preferably less than $1 \times 10^{11}$ Ω/square at 25° C. and 20 percent relative humidity. To lower the surface resistivity, a preferred method is to incorporate at least one type of electrically conductive material in the electrically conductive layer. Such materials include both conductive metal oxides and conductive polymers or oligomeric compounds. Such materials have been described in detail in, for example, U.S. Pat. Nos. 4,203,769; 4,237,194; 4,272,616; 4,542,095; 4,582,781; 4,610,955; 4,916,011; and 5,340,676.

The coating composition of the invention can be applied by any of a number of well-know techniques, such as dip coating, rod coating, blade coating, air knife coating, gravure coating and reverse roll coating, extrusion coating, slide coating, curtain coating, and the like. The ultraviolet ray absorbing particles and the binder are mixed together in a liquid medium to form a coating composition. After coating, the layer is generally dried by simple evaporation, which may be accelerated by known techniques such as convection heating. Known coating and drying methods are described in further detail in Research Disclosure No. 308, Published Dec. 1989, pages 1007 to 1008.

The present invention will now be described in detail with reference to examples; however, the present invention should not limited by these examples.

EXAMPLE

Ultraviolet Ray Absorber 1

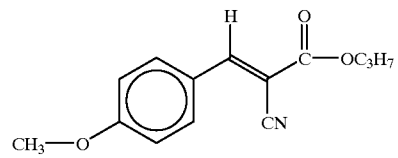

Ultraviolet Ray Absorber 2

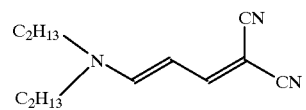

Example 1
(Invention)

An aqueous gelatin and surfactant solution is prepared by heating 7.5 grams of a deionized gelatin, 9.0 grams of a 10% solution of Alkanol XC surfactant, 0.3 grams of a 0.7% solution of Kathon LX biocide, and 65.6 grams of deionized water to 50° C. To the aqueous solution is added 61.6 grams of a 19.5% by weight of a poly(butyl acrylate-co- sodium 2-acrylamido-2-methylpropane sulfonate-co-acetoacetoxyethyl methacrylate) (85/5/5) latex prepared by emulsion polymerization. The resulting solution is then premixed using a rotor stator mixer while 3 grams of ultraviolet absorber 1 and 3 grams of ultraviolet absorber 2 are first mixed together at 50 degrees Celsius and added for 2 minutes. The resulting premix is passed one time through a Microfluidizer at 5000 psi and chill-set at 5° C. The resulting dispersion has a polymer to UV absorber ratio of 2:1 by weight.

The latex used in this example has a particle size of about 65 nm. Its ability to incorporate ultraviolet ray absorbers is measured by diluting the above dispersion to a nominal 1% polymer latex concentration and measuring the absorbance of this solution at 600 nanometers on a UV-VIS spectrophotometer having a fixed cell path length of 1 centimeter. A high absorbency value (>0.3) indicates incomplete incorporation of ultraviolet ray absorber in the polymer particle. An absorbance value of less than 0.3 is obtained for the above dispersion which indicates excellent incorporation of ultraviolet ray absorbers in the above polymer latex.

Stability of the ultraviolet ray absorbing particle dispersions during storage is determined by sampling the dispersions over time at room temperature to assess the presence of ultraviolet ray absorber crystals or leaching of ultraviolet ray absorbers into the water phase outside of the polymer particles. The above dispersion is stable for more than 10 weeks.

Example 2
(Comparison)

An aqueous gelatin and surfactant solution is prepared by heating 7.5 grams of a deionized gelatin, 9.0 grams of a 10% solution of Alkanol XC surfactant, 0.3 grams of a 0.7% solution of Kathon LX biocide, and 66.4 grams of deionized water to 50° C. To the aqueous solution is added 60.8 grams of a 19.7% poly(butyl acrylate-co-sodium 2-acrylamido-2-methylpropane-sulfonate-co-acetoacetoxyethyl methacrylate) (85/5/5) latex made by emulsion polymerization. The resulting solution is then premixed using a rotor stator mixer while 6.0 grams of ultraviolet ray absorber 1 is added for 2 minutes. The resulting premix is passed one time through a Microfluidizer at 5000 psi and chill set at 5 ° C. The resulting dispersion has a polymer to UV absorber ratio of 2:1 by weight.

When the loadability is measured as described in Example 1, an absorbance of less than 0.3 is obtained, which indicates excellent incorporation of the ultraviolet ray absorber 1 in the latex particle. However, the resultant ultraviolet ray absorbing polymer particle dispersion has poor stability against crystallization of ultraviolet ray absorber 1 into the water phase outside of the polymer particle phase when stored at room temperature.

Example 3
(Invention)

Ultraviolet ray absorbing polymer particle dispersion is prepared using the procedure in Example 1 except using a poly(butyl acrylate-co-styrene-co-methacrylamide-co-sodium 2-acrylamido-2-methylpropane sulfonate) (59/25/8/8 wt %) latex. The resulting dispersion had a polymer to ultraviolet ray absorbers of 2:1 by weight. The ultraviolet ray absorbers consist of ultraviolet ray absorber 1 and 2 at 1:1 ratio by weight.

When the loadability is measured as described in Example 1, an absorbance of less than 0.3 is obtained, which indicates excellent incorporation of the ultraviolet ray absorbers in the latex particle. The ultraviolet ray absorbing polymer particle dispersion has excellent stability when stored at room temperature.

Example 4
(Invention)

Ultraviolet ray absorbing polymer particle dispersion is prepared using the procedure in Example 1 except using a poly(butyl methacrylate-co-styrene-co-sodium 2-acrylamido-2-methylpropane sulfonate ) (30/60/10 wt %) latex. The resulting dispersion has a polymer to ultraviolet ray absorber ratio of 2:1 by weight. The ultraviolet ray absorbers consist of ultraviolet ray absorber 1 and 2 at 1:1 ratio by weight.

When the loadability is measured as described in Example 1, an absorbance of less than 0.3 is obtained, which indicates excellent incorporation of the ultraviolet ray absorbers in the latex particle. The ultraviolet ray absorbing polymer particle dispersion has excellent stability when stored at room temperature.

Example 5
(Invention)

Ultraviolet ray absorbing polymer particle dispersion is prepared using the procedure in Example 1 except using a poly(ethyl methacrylate-co-sodium 2-acrylamido-2-methylpropane sulfonate ) (95/5 wt %) latex. The resulting dispersion has a polymer to ultraviolet ray absorber ratio of 2:1 by weight. The ultraviolet ray absorbers consist of ultraviolet ray absorber 1 and 2 at 1:1 ratio by weight.

When the loadability is measured as described in Example 1, an absorbance of less than 0.3 is obtained, which indicates excellent incorporation of the ultraviolet ray absorbers in the latex particle. The ultraviolet ray absorbing polymer particle dispersion has excellent stability when stored at room temperature.

Example 6
(Invention)

Ultraviolet ray absorbing polymer particle dispersion is prepared using the procedure in Example 1 except using a poly(ethyl acrylate-co-sodium 2-acrylamido-2-methylpropane sulfonate ) (94/6 wt %) latex. The resulting dispersion has a polymer to ultraviolet ray absorber ratio of 2:1 by weight. The ultraviolet ray absorbers consist of ultraviolet ray absorber 1 and 2 at 1:1 ratio by weight.

When the loadability is measured as described in Example 1, an absorbance of less than 0.3 is obtained, which indicates excellent incorporation of the ultraviolet ray absorbers in the latex particle. The ultraviolet ray absorbing polymer particle dispersion has excellent stability when stored at room temperature.

Example 7
(Comparison)

Ultraviolet ray absorbing polymer particle dispersion is prepared using the procedure in Example 1 except using a poly(methyl acrylate-co-sodium 2-acrylamido-2- methylpropane sulfonate ) (96/4 wt %) latex. The resulting dispersion has a polymer to ultraviolet ray absorber ratio of 4:1 by weight. The ultraviolet ray absorbers consist of ultraviolet ray absorber 1 and 2 at 1:1 ratio by weight.

When the loadability is measured as described in Example 1, an absorbance of 0.8 is obtained, which indicates very poor incorporation of the ultraviolet ray absorbers in the latex particle. The ultraviolet ray absorbing polymer particle dispersion has poor stability when stored at room temperature.

Example 8

(Comparison)

Ultraviolet ray absorbing polymer particle dispersion is prepared using the procedure in Example 1 except using a poly(methyl methacrylate-co-sodium 2-acrylamido-2-methylpropane sulfonate ) (95/5 wt %) latex. The resulting dispersion has a polymer to ultraviolet ray absorber ratio of 4:1 by weight. The ultraviolet ray absorbers consist of ultraviolet ray absorber 1 and 2 at 1:1 ratio by weight.

When the loadability is measured as described in Example 1, an absorbance of 0.65 is obtained, which indicates very poor incorporation of the ultraviolet ray absorbers in the latex particle. The ultraviolet ray absorbing polymer particle dispersion has poor stability when stored at room temperature.

Example 9

(Comparison)

Ultraviolet ray absorbing polymer particle dispersion is prepared using the procedure in Example 1 except using a poly(styrene-co-sulfoethyl methacrylate, sodium salt) (90/10 wt %) latex. The resulting dispersion has a polymer to ultraviolet ray absorber ratio of 2:1 by weight. The ultraviolet ray absorbers consist of ultraviolet ray absorber 1 and 2 at 1:1 ratio by weight.

When the loadability is measured as described in Example 1, an absorbance of 3.33 is obtained, which indicates very poor incorporation of the ultraviolet ray absorbers in the latex particle. The ultraviolet ray absorbing polymer particle dispersion has poor stability when stored at room temperature.

The above examples show that the ultraviolet ray absorbing polymer particle of the present invention have excellent stability against crystallization and leaching out of ultraviolet ray absorbers into water phase with respect to the storage. This improves manufacturability of photographic elements employing such ultraviolet ray absorbing polymer particles.

The invention has been described in detail with particular reference to certain preferred embodiments thereof, but it will be understood that variations and modifications can be effected within the spirit and scope of the invention.

What is claimed is:

1. An imaging element comprising a support, at least one light-sensitive layer and at least one layer containing ultraviolet ray absorber particles comprising:

a first ultraviolet ray absorber represented by formula I:

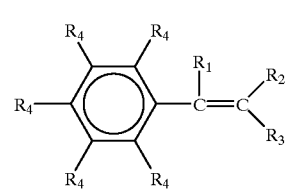

(I)

wherein $R_4$ is each independently selected from the group consisting of hydrogen, halogen, alkyl and aryl having from 6 to 20 carbon atoms, alkoxy group, aryloxy, alkylthio group, arylthio group, amine group, alkylamino group, arylamino group, hydroxyl group, cyano group, nitro group, acylamino group, sulfonyl group, sulfoamido group, acyloxy group, oxycarbonyl group, or two neighboring R4 groups may form a 5- or 6-member ring by ring closure; $R_1$ represents a hydrogen atom, or an alkyl group; $R_2$ or $R_3$ each represents a cyano group, —$COOR_9$, —CO—$NHR_9$, —$SO_2R_9$, CO—$R_9$, where $R_9$ represents an alkyl group, and an aryl group;

a second ultraviolet ray absorber represented by formula II:

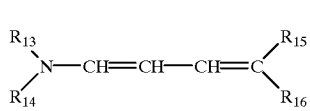

(II)

where $R_{13}$, and $R_{14}$, which may be the same or different, each represents a hydrogen atom, an alkyl group, an aryl group, $R_{15}$ and $R_{16}$ each represents a cyano group, —$COOR_{17}$, $COR_{17}$, or $SO_2R_{17}$, where $R_{17}$ represents an alkyl group, or an aryl group; and a polymer comprising units derived from a first monomer A and less than 20 weight percent of a second monomer B, where the first monomer A represents ethylenically unsaturated monomers comprising greater than 20 weight percent of an acrylic monomer selected from acrylic acid and methacrylic acid esters where the ester group contains at least 2 carbon atoms, and the second monomer B represents ethylenically unsaturated monomers capable of forming water soluble polymers.

2. The imaging element according to claim 1 wherein the selected acrylic monomer is selected from the group consisting of ethyl methacrylate, n-butyl methacrylate, isobutyl methacrylate, t-butyl methacrylate, isopropyl methacrylate, amyl methacrylate, hexyl methacrylate, cyclohexyl methacrylate, chloroethyl methacrylate, ethyl acrylate, n-butyl acrylate, t-butyl acrylate, isopropyl acrylate, amyl acrylate, cyclohexyl acrylate, hexyl acrylate, n-octyl acrylate, lauryl methacrylate, 2-ethylhexyl methacrylate, nonyl acrylate, and benzyl methacrylate.

3. The imaging element according to claim 1 wherein the ethylenically unsaturated monomer of monomer A of the polymer particles is selected from the group consisting of methyl methacrylate, methyl acrylate, acrylonitrile, methacrylonitrile, butyl acrylamide, vinyl acetate, vinyl propionate, vinylidene chloride, vinyl chloride, styrene, t-butyl styrene, ethyl vinyl benzene, vinyl toluene, dialkyl maleates, dialkyl itaconates, dialkyl malonates, isoprene, and butadiene.

4. The imaging element of claim 3 wherein the polymer particles further comprise crosslinking and grafting monomers selected from the group consisting of esters of unsaturated monohydric alcohols with unsaturated monocarboxylic acids, dienes, esters of saturated glycols or diols with unsaturated monocarboxylic acids, and polyfunctional aromatic compounds.

5. The imaging element according to claim 1, wherein monomer B of the polymer particles is selected from the group consisting of (meth)acrylamides, poly(ethylene glycol)(meth)acrylates, N-vinyl-2-pyrrolidone, vinylimidazole, acrylic acid, methacrylic acid, sodium acrylamido-2-methylpropane sulfonate, and sodium styrene sulfonate.

6. The imaging element according to claim 1, wherein the ultraviolet absorbers of the polymer particles are present in an amount of from 1:40 to 3:1 in terms of a weight ratio of ultraviolet ray absorber to polymer.

7. The imaging element according to claim 1 wherein the polymer particles comprise a size of from about 0.01 $\mu$m to 50 $\mu$m.

* * * * *